United States Patent
He et al.

(10) Patent No.: US 7,031,025 B1
(45) Date of Patent: Apr. 18, 2006

(54) COMBINED DOT DENSITY AND DOT SIZE MODULATION

(75) Inventors: Zhen He, West Lafayette, IN (US); Charles A. Bouman, West Lafayette, IN (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

(21) Appl. No.: 09/645,790

(22) Filed: Aug. 23, 2000

(51) Int. Cl.
*H04N 1/40* (2006.01)

(52) U.S. Cl. ............ 358/3.09; 358/3.11; 358/3.12

(58) Field of Classification Search ...... 358/3.06–3.13, 358/1.9, 534–536, 3.32; 382/237
See application file for complete search history.

(56) References Cited

U.S. PATENT DOCUMENTS

| | | | | |
|---|---|---|---|---|
| 5,841,956 A | * | 11/1998 | Venkateswar et al. | 358/1.9 |
| 5,892,588 A | * | 4/1999 | Samworth | 358/3.19 |
| 5,946,455 A | | 8/1999 | Tresser et al. | |
| 6,445,465 B1 | * | 9/2002 | Samworth | 358/1.9 |
| 6,563,604 B1 | * | 5/2003 | Morimatsu et al. | 358/3.09 |

FOREIGN PATENT DOCUMENTS

| | | |
|---|---|---|
| CA | 2311562 A1 * | 12/2001 |
| EP | 0532180 | 3/1993 |
| EP | 0204094 | 8/1998 |
| EP | 0978997 | 2/2000 |
| JP | 60242771 A * | 12/1985 |

OTHER PUBLICATIONS

Lieberman, David J. et al., "Efficient Model Based Halftoning Using Direct Binary Search", IEEE, 1997, pp. 775-778.

* cited by examiner

*Primary Examiner*—Thomas D. Lee
*Assistant Examiner*—Stephen Brinich

(57) ABSTRACT

A combined dot density and size modulation system uses dispersed dot halftoning in conjunction with dot size modulation to produce a halftone image in which both the density and size of the dots are modulated to control overall gray level. The dot density and size modulation system offers advantages over pure dot density modulation systems or pure dot size modulation systems because it allows an extra degree of flexibility which can be used to increase the visual quality of the halftoned pattern and/or increase the robustness of the halftoning to printer artifacts and variations. An input pixel value is used to independently produce a dot density value and a dot size value. The dot density value and dot size values may be obtained from, e.g., look up tables that have been optimized for print quality and printer stability. Dispersed dot halftoning is used to provide a halftone value for the desired pixel location using the dot density value. The dispersed dot halftoning may be, e.g., tone dependent error diffusion. The halftone value and the dot size value for the pixel location is then used to generate a modulated code, e.g., a pulse width modulated code, to the printer. The modulated code may include both the pulse width of the desired dot for the pixel location as well as the justification, e.g. left, center, or right, for the pixel location. The dot density and size modulation system is particularly useful in modern electrophotographic printing systems that allow the printed dot size to be almost continuously varied through the specification of a pulse width modulation (PWM) code.

23 Claims, 10 Drawing Sheets

COMBINED DOT DENSITY AND DOT SIZE MODULATION

CROSS REFERENCE TO APPENDICES

This application is related to application Ser. No. 09/648,531 which is incorporated herein by reference in its entirety.

CROSS REFERENCE TO APPENDICES

Appendix A1, which is part of the present disclosure, is an appendix consisting of 8 pages. Appendix A1 lists source code written in C programming language of an illustrative embodiment of the present invention using an eight-bit code to control a printer system having a pulse width modulated laser capability for each printed pixel. Appendix A2, which is part of the present disclosure, is an appendix consisting of 13 pages. Appendix A2 lists the particular coefficients used in the Tone-Dependent Error Diffusion process for the eight-bit code used in accordance with an embodiment of the present invention. Appendix B1, which is part of the present disclosure, is an appendix consisting of 14 pages. Appendix B1 lists source code written in C programming language of an illustrative embodiment of the present invention using a two-bit code to control a printer system having a pulse width modulated laser capability for each printed pixel. Appendix B2, which is part of the present disclosure, is an appendix consisting of 2 pages. Appendix B2 lists source code written in C programming language that is used in conjunction with Appendix B1 for a two-bit code used to control a printer system having a pulse width modulated laser capability for each printed pixel. Appendix B3, which is part of the present disclosure, is an appendix consisting of 22 pages. Appendix B3 lists the particular coefficients used in the Tone-Dependent Error Diffusion process for the two-bit code used in accordance with an embodiment of the present invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

FIELD OF THE INVENTION

The present invention relates to halftoning, and in particular to a halftoning method that combines dot size modulation and dot spacing modulation to control the overall gray level in an image forming or printing device.

BACKGROUND

Continuous-tone images, such as charts, drawings, and pictures, may be represented as a two-dimensional matrix of picture elements (pixels). The spatial resolution and intensity level for each pixel are chosen to correspond to the particular output device used. Typically, digital halftoning is used to transform a continuous-tone image into the desired matrix of pixels.

Conventional methods for digital halftoning generally fall into two categories: clustered dot and dispersed dot. As is well known in the art, in clustered dot techniques, the size of the printed dot is varied to control the perceived gray level or, equivalently, density of the printed tone. These methods may be thought of as amplitude modulation (AM) halftoning techniques since the amplitude or size of the dots controls the printed gray level.

FIG. 1 is a block diagram illustrating a conventional clustered dot halftoning process. As shown in FIG. 1, typically, an image x(m, n) is transformed, or tone compensated, at block 2, so that the printed gray level for each input value is correct. Tone compensation (block 2) is used to correct for attributes of the halftoning algorithm, image calibration, and printer behavior. In particular, most printers are not linear due to the inevitable effects of dot overlap. The dot size is then modulated at block 4 and the resulting signal is sent to the printing system. Typically, dot size modulation is performed using screening, which uses a threshold array that is compared to the pixel value. AM halftoning methods have certain advantages such as increased robustness to printing artifacts. However, a limitation of AM halftoning methods is that the choice of dot size presents a fundamental tradeoff between spatial resolution and number of gray levels.

Dispersed dot halftoning methods control the printed gray level through the spacing or, equivalently, the frequency of dot placement. Dispersed dot halftoning may be thought of as a frequency modulation (FM) halftoning technique since the frequency or spacing of the dots controls the printed gray level. Dispersed dot halftoning methods are well known, and include, for example, error diffusion halftoning, screening and, most recently, iterative search based halftoning. FIG. 2 is a block diagram illustrating a conventional dispersed dot halftoning process. As with the clustered dot halftoning process, the image x(m, n) is transformed, or tone compensated at block 6, so that the printed gray level for each input value is correct. The spacing of the dots is then appropriately dispersed at block 8 and the resulting signal is sent to the printing system.

Typically, dispersed dot halftoning uses the smallest dots possible to print as it is undesirable to actually notice the dots in the printed image. However, a drawback of dispersed dot halftoning is that the printer must be capable of printing well formed isolated dots. For example, error diffusion is typically used only in inkjet type printers because they generally can print stable isolated dots. However, error diffusion is typically not used in commercial electrophotographic printers and copiers, such as laser printers, due to their instability in producing binary or multilevel halftones.

SUMMARY

A halftoning system, in accordance with an embodiment of the present invention, uses dispersed dot halftoning in conjunction with dot size modulation to produce an image in which the density and size of the dots are modulated in conjunction to control the overall gray level in an image forming system. The dot density is modulated to control the spacing or frequency of the dot to be printed for a particular pixel location with respect to dots to be printed at preceding and subsequent pixel locations, while the dot size is modulated to control the size of the dot to be printed at the particular pixel location. The dot density and size modulation system may be used with an image forming or printing system, e.g., a computer and a printer. It should be understood that the image forming or printing system of the present invention is intended to include, but is not limited to, an electrophotographic printer or copier, an ink jet printer, a facsimile machine or any other device that may be used to print an image. The dot density and size modulation system is particularly useful in modern electrophotographic printing systems that allow the printed dot size to be almost continuously varied through the specification of a pulse width modulation (PWM) code.

In accordance with an embodiment of the present invention, the dot density is modulated by controlling the dot density for a pixel location using an input pixel value for that pixel location and by performing dispersed dot halftoning to produce a dot position based on the dot density. For example, a look up table may generate a dot density value based on the input pixel value, which is then used in the dispersed dot halftoning process. The dispersed dot halftoning process may be error diffusion, e.g., tone dependent error diffusion, dispersed dot screening, or iterative search based halftoning. Tone dependent error diffusion is particularly advantageous because it generates high quality dispersed dot patterns and is computationally efficient.

The dot size is modulated, in accordance with an embodiment of the present invention, by independently controlling the dot size for the pixel location using the input pixel value and performing dot size modulation based on both the dot size and the dot position. Thus, for example, a separate look up table may be used to generate the dot size value based on the input pixel value. Advantageously, the dot size control and dot density control may be precomputed, and in one embodiment are designed with respect to each other and the characteristics of the printing system to optimize the image while matching the printing device characteristics. The resulting dot size value, as well as the dot position from the dispersed dot halftoning process, are then used to generate a signal, e.g., a pulse width modulated code, that controls the printer system. The signal may be produced by another look up table and may include information regarding both the pulse width of the desired dot for the pixel location as well as the justification, e.g. left, center, or right, for the pixel location.

In accordance with an embodiment of the present invention, the dot size look-up table and dot density look-up table are designed with respect to each other and the characteristics of the printing system in a closed loop measurement process to optimize the quality of the image while matching the printing device characteristics.

The system, in accordance with the present invention, uses a combination of the dot size and dot density to produce the desired gray level, which offers advantages over pure dot density modulation systems or pure dot size modulation systems. The combination of dot density and dot size modulation allows an extra degree of flexibility, which can be used to increase the visual quality of the halftoned pattern and/or increase the robustness of the halftoning to printer artifacts and variations.

DETAILED DESCRIPTION

Figure 1:
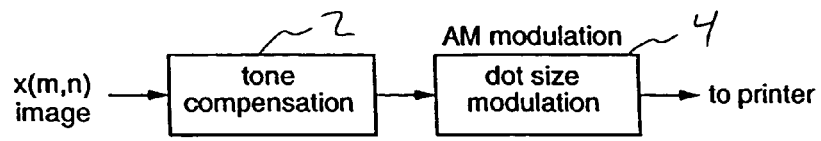
FIG. 1 is a block diagram illustrating a conventional clustered dot halftoning process.
Figure 2:
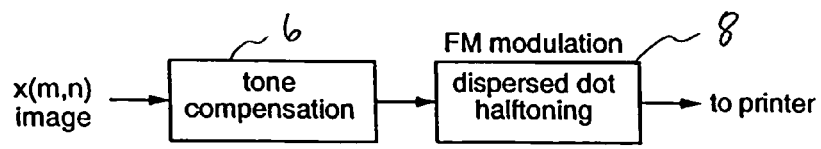
FIG. 2 is a block diagram illustrating a conventional dispersed dot halftoning process.
Figure 3:
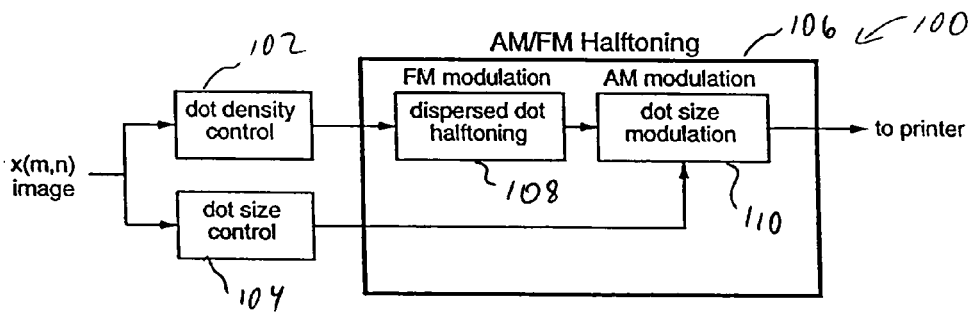
FIG. 3 is a block diagram illustrating a dot density and dot size modulation (referred to herein as AM/FM halftoning) system, in accordance with an embodiment of the present invention.

FIG. 3 is a block diagram illustrating a dot size and density modulation system (referred to herein as an AM/FM halftoning system) 100, in accordance with an embodiment of the present invention. As shown in FIG. 3, each pixel x(m,n) of an image to be printed is processed to determine the dot density, at dot density control 102, and the dot size, at dot size control 104. The AM/FM halftoning system 100 includes a subsystem 106 with a FM modulation portion, e.g., dispersed dot halftoning unit 108, and an AM modulation portion, e.g., dot size modulation unit 110.

The dot density control 102 provides a dot density value that is received by the dispersed dot halftoning unit 108 to determine the positions of dots on the discrete printing grid. The dot size control 104 provides a dot size value that is received by the dot size modulation unit 110 along with the positions of the dots from the dispersed dot halftoning unit 108. The dot size modulation unit 110 generates an output signal indicating the modulated size and modulated density of the dot to be printed for the input pixel x(m,n) by the printing system.

Figure 4:
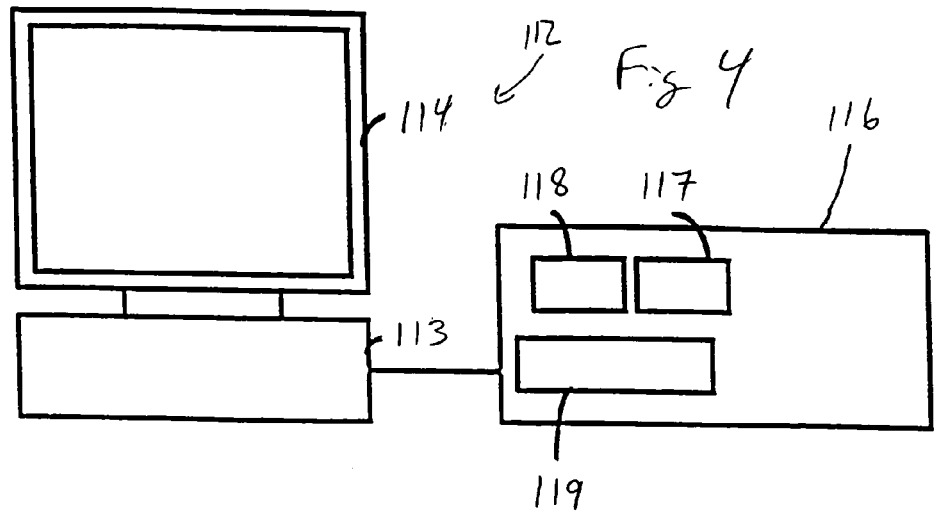
FIG. 4 is a schematic diagram of a printing system, including a printer and a computer that may be used with the present invention.

FIG. 4 is a schematic diagram of a printing system 112 that includes a host computer 113, a monitor 114 (e.g., a CRT), and a printer 116, which may be used with the present invention. Printer 116 could be any type of printer that prints black and/or color dots, including an electrophotographic printer, e.g., a laser printer, or copier, or an inkjet printer. Printer 116 typically includes a toner cartridge 117, which delivers particles of dry toner via electrostatic attraction to a rotating drum or sheet of paper. The paper is then heated to melt the toner so that the toner permanently adheres to the paper. For inkjet printers, a print cartridge is typically used that scans across the paper and prints droplets of ink in a well known fashion. Additional toner cartridges 118 may also be included in printer 116, for example, to provide different color inks. Printer 116 often includes a printer controller 119 for controlling the printing of dots, and in fact, may include the host computer 113 within printer 116, in which case monitor 114 is not needed. There are many well-known types of these devices, and details of their operation need not be presented here for a clear understanding of the operation of the present invention.

Figure 5:
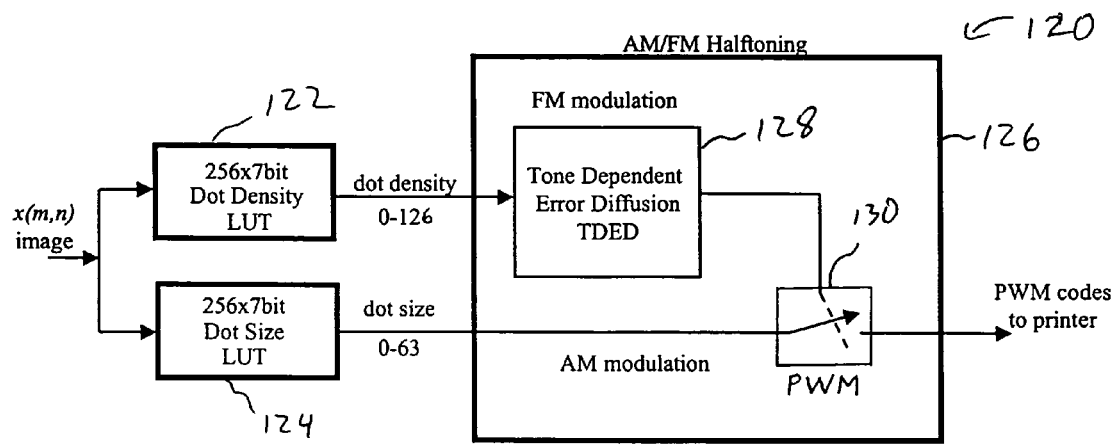
FIG. 5 shows a block diagram of an embodiment of the AM/FM halftoning system in which the dot density control and dot size control are look-up tables and the dispersed dot halftoning is tone dependent error diffusion.

FIG. 5 shows a block diagram of one embodiment of an AM/FM halftoning system 120 in accordance with the present invention, in which the dot density control is a first 256×7 bit look-up table ("LUT") 122 and dot size control is a second 256×7 bit LUT 124. In this embodiment, the dot density control LUT 122 and dot size control LUT 124 map each input pixel x(m, n) to a specific desired value. In one embodiment, LUT 122 produces a dot density value ranging from 0 to 128 and LUT 124 produces a dot size value ranging from 0 to 63, but these values may vary if desired. For example, in some printing systems the dot density value may vary between 0 and 255. Moreover, the dot density control and the dot size control, in other embodiments, may be more general and may depend on the local neighborhood of the input pixel x(m, n), which might be useful, e.g., for purposes of enhancing the quality of text or image edges, or more accurately rendering textures or smooth gradients.

Advantageously, both the dot density and dot size are varied independently based on attributes of the input image x(m, n). Nevertheless, neither the dot density control nor the dot size control independently control the printed tone. Instead, the printed tone is controlled through a combination of the two. The dot density and size are designed with respect to each other and the printing system to optimize the printed image while matching the device characteristics of the printing system. Consequently, tone correction may be incorporated directly into the combined density/size control.

As shown in FIG. 5, the FM modulation the dispersed dot halftoning unit is a tone dependent error diffusion (TDED) system 128. The TDED system 128 may be, for example, similar to that described in U.S. patent Ser. No. 09/307,003, entitled "Tone Dependent Error Diffusion" to Pingshan Li and Jan P. Allebach, filed May 7, 1999, which is incorporated herein by reference. Tone dependent error diffusion is advantageous because it generates high quality dispersed dot patterns and is computationally efficient. The dispersed dot halftoning unit, however, may depend on the particular application, i.e., printer system, and may be any one of a wide variety of known halftoning methods including error diffusion, dispersed dot screening, or iterative search based halftoning such as direct binary search (DBS), which is described, for example, in M. Analoui and J. Allebach, "Model-Based Halftoning Using Direct Binary Search,", Proc. SPIE/IS&T's symp., electr, imag. sci. and tech., vol. 1666, pp. 96–108, San Jose, Calif., February, 1992, and which is incorporated herein by reference.

Typically, the quantity varied in dispersed dot halftoning is the dot spacing, which is specified using the number of dots per unit area or dot density. It should be understood, however, that for some dispersed dot halftoning methods the output of the dot density control may be only approximately equal to the true dot density. For more information regarding dispersed dot halftoning in general, see for example, J. Mulligan and A. Ahumada, Jr., "Principled Halftoning Based on Models of Human Vision," Proc. SPIE/IS&T's symp., electr, imag. sci. and tech., vol. 1666, pp. 109–121, San Jose, Calif., February, 1992; and T. Pappas, and D. Neuhoff, "Least-Squares Model-Based Halftoning," Proc. SPIE/IS&T's symp., electr, imag. sci. and tech., vol. 1666, pp. 165–176, San Jose, Calif., February, 1992, which are incorporated herein by reference.

Figure 6:
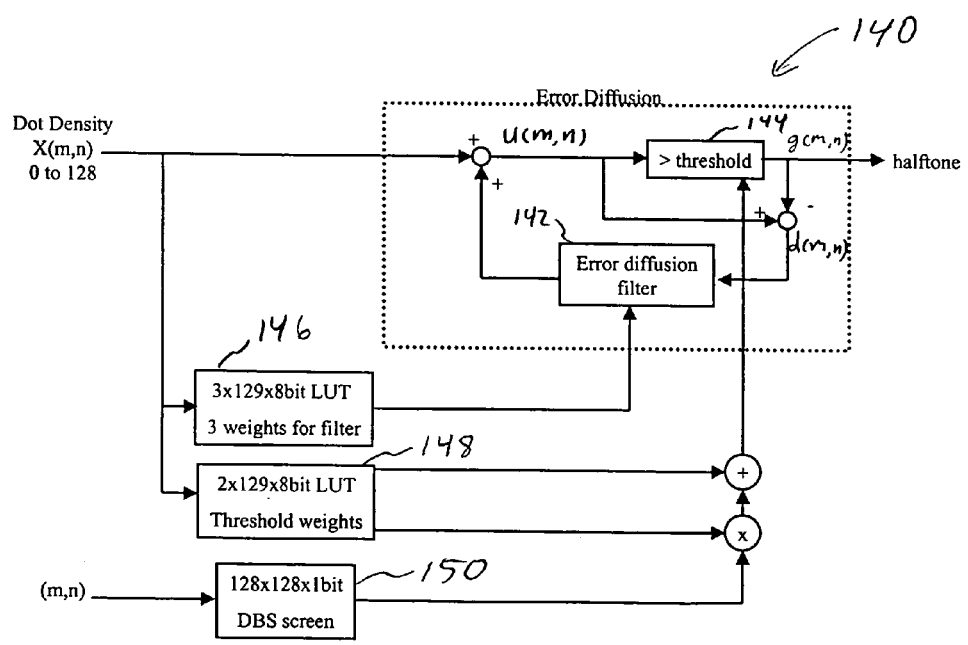
FIG. 6 shows a block diagram of a tone dependent error diffusion, which may be used in the AM/FM halftoning system of FIG. 5.

FIG. 6 shows a block diagram of a TDED system 140, which may be used as the TDED system 128 of FIG. 5 to produce a TDED output in the form of a halftone value, in accordance with an embodiment of the present invention. The input pixel value, which has continuous-tone value, e.g., from 0 to 128, is represented as X(m,n), where m and n are the pixel locations. The TDED system 140 uses an error diffusion filter 142, which acts as a weighting matrix, and a threshold matrix 144.

The input pixel value is placed in a weight LUT 146, which may be, e.g., a 3×129×8 bit LUT, and which produces three different weights for the error diffusion filter 142. The input pixel value is also placed in a threshold weight LUT 148, which may be, e.g., a 2×129×8 bit LUT, and which produces two different thresholds for the threshold matrix 144. In addition, the pixel location (m,n) is received by a direct binary search screen (DBS) 150, the output of which is multiplied by the resulting output of threshold weight LUT 148, which is then summed with the other resulting output of threshold weight LUT 148. The summed result is then provided to the threshold matrix 144.

The error diffusion filter 142 provides an error value from previously processed pixels that is summed with the input pixel value X(m,n), to produce a modified pixel value u(m,n). The modified pixel value u(m,n) is received by the threshold matrix 144 and compared to at least one threshold level to produce the output halftone value g(m,n). A quantizer error value d(m,n) is produced as the difference between the output halftone value g(m,n) and the modified pixel value u(m,n). The quantizer error d(m,n) is received by the error diffusion filter 142, and is diffused to neighboring, subsequently processed pixel locations. See U.S. patent Ser. No. 09/307,003, entitled "Tone Dependent Error Diffusion" to Pingshan Li and Jan P. Allebach, filed May 7, 1999, which is incorporated herein by reference for a discussion of the implementation of the TDED system 140. As one of ordinary skill in the art understands, a TDED system may be optimized for particular printing systems and printing characteristics by altering the particular process coefficient. For the particular coefficients used in accordance with an embodiment of the present invention, see Appendix A2.

Figure 7A:
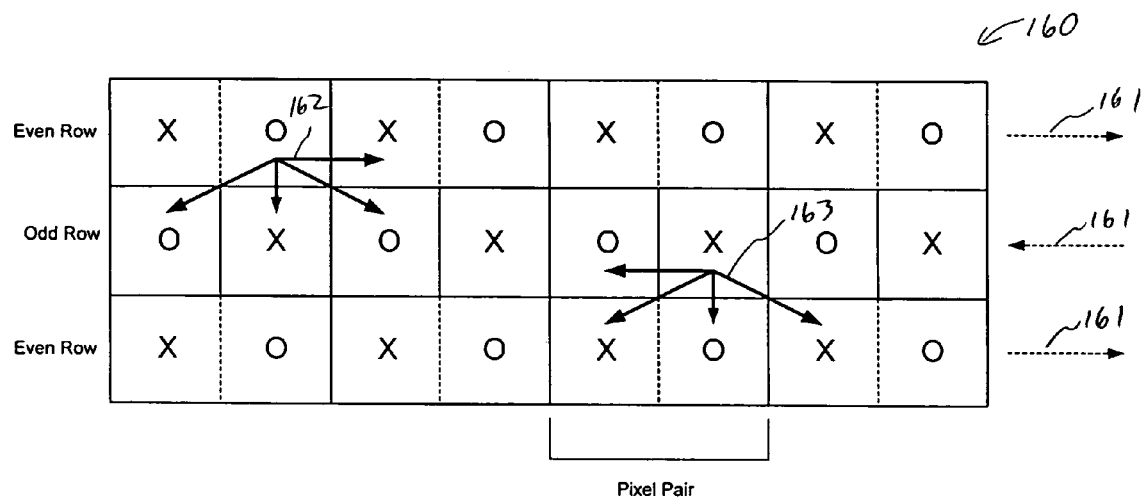
FIGS. 7A and 7B show an array of pixels and a pixel pair, respectively, illustrating the error diffusion used in accordance with an embodiment of the present invention.
Figure 7B:
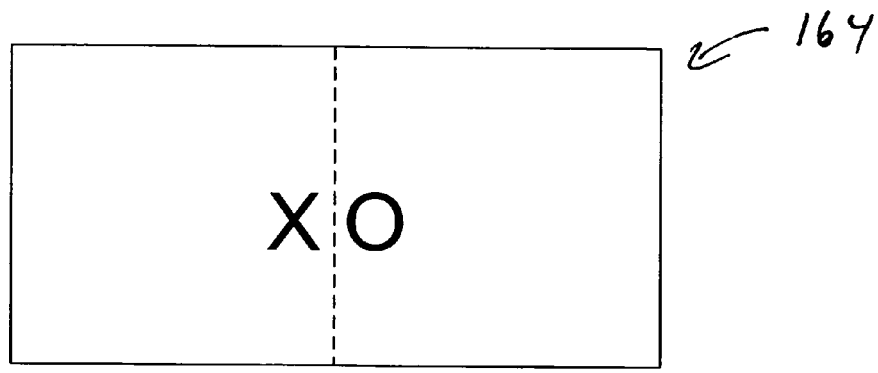

FIGS. 7A and 7B show an array of pixels 160 and a pixel pair 164, respectively, illustrating the error diffusion of the TDED system 128 in accordance with one embodiment of the present invention. As illustrated in FIG. 7A, the dots are printed using a serpentine raster scan as indicated by arrows 161. The pixels are organized in pixel pairs, in which a modulated dot will be fired in only one pixel illustrated with an "X". The pixels which are illustrated with an "O" will not have a dot fired. The dots are constrained to fire at positions on a diagonal grid pattern. The tone dependent error diffusion uses four weights that are diffused to four adjacent pixels, as indicated by arrows 162 and 163. As shown in FIG. 7A, the error is diffused to the next pixel to be processed, regardless of whether a dot will be fired in that pixel and to the three adjacent pixels in the next row, again regardless of whether a dot will be fired in that pixel. As shown in FIG. 7B, which shows a pixel pair 164, in one embodiment of the present invention, each pixel in a pixel pair 164 is justified towards the other pixel. Thus, the left hand pixel "X" is right justified and the right hand pixel "O" is left hand justified.

As shown in FIG. 5, the dot size modulation is a pulse width modulation (PWM) system 130 that directly modulates the size of the physical dot, as is well known in the art. The dot size modulation step requires very little computation since the appropriate PWM codes for each dot size may be precomputed and stored in a LUT and is accessed using the halftone value from the TDED system 128 and the dot size value from the dot size LUT 124. The dot size modulation, however, may also depend on the particular application, i.e., printing system, and may be any one of a number of known methods which vary the size of a printed dot either by grouping clusters of dots together, including clustered dot digital halftoning.

The PWM system 130 produces a signal, e.g., an eight-bit PWM code, that controls the size of the printed dot, for example, produced by a laser in an electrophotographic printer. As is well understood in the art, in an electrophotographic printer, the toner is only deposited when the laser is on. Thus, each six-bit PWM code controls the width of a single pixel. The output signal from the PWM system 130 may also include two bits of information regarding the justification of the dot, i.e., whether the dot is left, center or right justified within the pixel.

The source code in Appendix A1 written in C programming language is one example of an implementation of the present invention using an eight-bit PWM code to control a printer system having a pulse width modulated laser capability for each printed pixel.

In FIG. 7A each grouping of two adjacent pixels is referred to as a pixel pair and is shown with an X on the left pixel and a 0 on the right pixel. A single example pixel pair is indicated at the bottom of FIG. 7. Each pixel pair is either enabled or disable depending on the TDED output value at the X position corresponding to the left hand pixel in the pixel pair. If TDED output value indicates that a dot should fire at the X position, then the pair is enabled. If the TDED output value does not indicate that a dot should fire at the X position, then the pair is not enabled. If the pair is not enabled, then the PWM codes for both the X position and the 0 position of the pixel pair are set to 0 and nothing is printed at either of the two pixels. If the pixel pair is enabled, then each of the two pixels are AM modulated separately using dot size value from the dot size LUT 124. More specifically, the PWM code for the left pixel, denoted by XPWM, and the PWM code for the right pixel, denoted by OPWM, are computed as follows:

$$XPWM = DotSizeLUT(\text{left pixel}) >> 1 + RightHandJustification; \text{ and} \quad \text{equ. 1}$$

$$OPWM = (DotSizeLUT(\text{right pixel}) + 1) >> 1 + LeftHandJustification. \quad \text{equ. 2}$$

If a dot is not fired, then XPWM=OPWM=off. Here the values "left pixel" and "right pixel" denote the values of the continuous tone image to be printed at the corresponding left and right locations of the pixel pair.

Figure 8A:
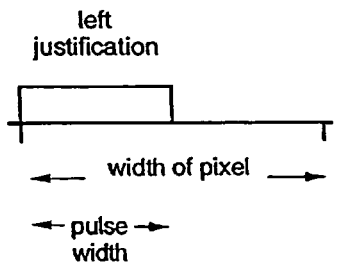
FIGS. 8A, 8B, and 8C show an idealized laser modulation output for a PWM system in which the width of the pulse may be less than the full width of the pixel and may be left, center, or right justified, respectively.
Figure 8B:
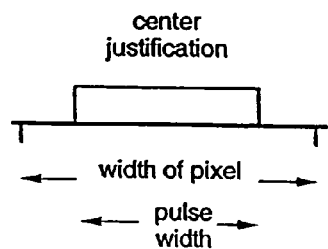
Figure 8C:
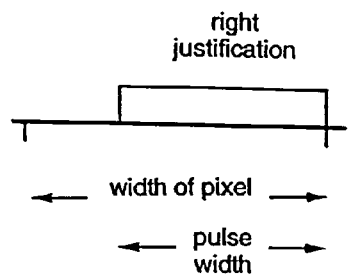

FIGS. 8A, 8B, and 8C shows an idealized laser modulation output for a PWM system in which the width of the pulse may be less than the full width of the pixel and may be left, center, or right justified, respectively. Thus, for example, the lower six bits of a eight-bit PWM code may specify the width of the laser pulse, and the highest two bits specify the justification (left, center, or right). The pulse width value ranges from 0 to 63, where 0 specifies a width 0 pulse, and 63 specifies a pulse that is the full width of the pixel. The PWM codes that may be used to specify the justification for each modulated pixel are given in Table 1.

TABLE 1

| 1st Bit | 2nd Bit | Value | Justification |
|---|---|---|---|
| 1 | 1 | 0xc0 | Right |
| 0 | 1 | 0x40 | Left |
| 0 | 0 | 0x00 | Center |
| 1 | 0 | 0x80 | Undefined |

Figure 9:
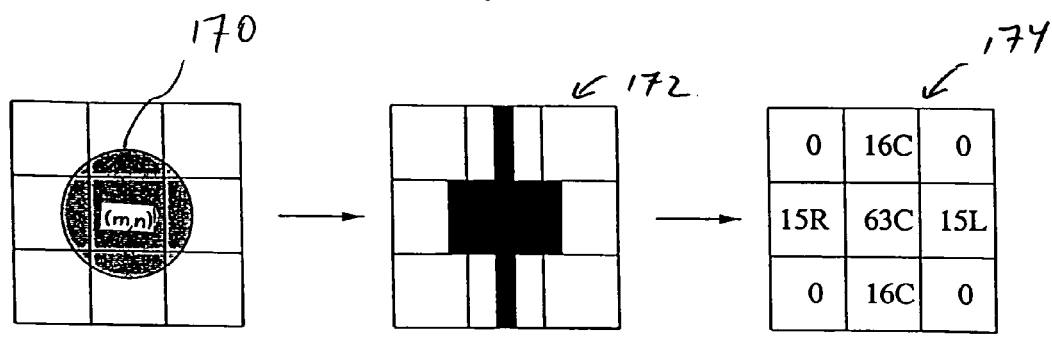
FIG. 9 illustrates the method used to form a circular dot with an area $\theta=2$ and that is centered at pixel (m,n).

FIG. 9 illustrates another method to form a dot, in accordance with an embodiment of the present invention. FIG. 9 shows a method used to form a circular dot 170 with an area θ=2 and that is centered at pixel (m,n). First, the radius of the desired ideal dot is determined as $$r = \sqrt{\theta/\pi}.$$

. Then, for each row of pixels, the area of intersection between the row and the ideal dot is calculated. To do this, let k index the rows of the image, and let k=0 for the row containing the pixel (m, n). Then the region of intersection is defined by $$S_k = \{(x,y) : x^2 + y^2 < r \text{ and } |x-k| < 1/2\} \quad \text{equ.3}$$

where x and y are the distance from the center of the pixel (m, n). The area of intersection is then $\beta_k = \text{Area}\{S_k\}$. If $\beta_k > 1$, then $n_k = 2\lfloor(\beta_k-1)/2\rfloor+1$ pixels in the $k^{th}$ row are fully turned on. For the remaining fractional area $\gamma_k = \beta_k - n_k$, two pixels on either side of the fully turned on pixels are turned on, each with area $\gamma_k/2$. The group of pixels are justified so that the dot is more compact, i.e., the left side pixel is right justified and the right side pixel is left justified so that the dot is formed by one pulse. If $\beta_k < 1$, we just turn on one pixel of area $\beta_k$ with center justification. This is illustrated in FIG. 9 as array 172. The PWM codes, with values ranging from 0 to 63 and an indication of left (L), right (R), and center (C) justification, for each pixel is shown in array 174 in FIG. 9. Importantly, the mapping of the dot size θ to the PWM codes can be precomputed and implemented using a LUT in PWM 130 (shown in FIG. 5). Precomputing the PWM codes and using a LUT increases the speed of operation. In some embodiments, a rectangular dot rather than a circular dot may be used. The use of a rectangular dot has the advantage that when the dot area θ is less than 1 only a single pixel is modulated. The use of a rectangular dot makes the dot printing more stable for dot size θ>1.

When the dot area is greater than 1, i.e. θ is greater than 1, dot overlap may occur. In this case, the pulse widths are added, and only the first pulse justification is retained. More specifically, suppose there are N dots indexed by i=1, ..., N that correspond to the same pixel location. Let $b_i$ be the justification part (the two most significant bits) of the PWM code, and let $a_i$ be the pulse width part (the remaining six bits) of an eight-bit PWM code. Then the PWM code for a pixel is determined by $$C_{m,n} = b_1 + \min\left(63, \sum_{i=1}^{N} a_i\right) \quad \text{equ. 4}$$

The value of the pulse width is clipped if it exceeds the maximum value of 63. The effects of this clipping on the tone curve are removed when the dot density control LUT 122 (FIG. 5) and dot size control LUT (124) are designed to prevent distortion of the tone curve.

In some cases, 63 pulse width levels of PWM may be available or less than 63 levels of pulse width modulation may be available, which may cause contouring artifacts in the printed images. In either case, contouring happens because a change of one level in the PWM code is substantial enough to cause a visible difference in gray level. To eliminate this problem, the pulse width codes may be dithered. The dithering may be done using random numbers, a white noise threshold mask, a dispersed dot threshold mask (such as the DBS screen 150 shown in FIG. 6), or an error diffusion process. The dithering functions similar to multi-level halftoning algorithm and eliminates visual contours.

The dot density and dot size controls are selected to obtain the desired gray level, e.g. tone curve, for each input value x(m, n). Advantageously, the dot size control and dot density control may be precomputed, and in one embodiment are designed with respect to each other and the characteristics of the printing system in a closed loop measurement process to optimize the quality of the image while matching the printing device characteristics. Because the tone curve is controlled through the combination of the dot density control and dot size control there is an additional degree of freedom that may be used to optimize a variety of printing attributes including print quality and/or print stability. In other words, it is possible to achieve most desired tone curves by either varying the size of the dots or the density of the dots. Therefore, a particular choice of a dot size necessitates a specific dot density to achieve the desired tone curve. The object is then to select the dot size, at each desired output density, that produces the "best" printed output. The dot density LUT 122 and dot size LUT 124 are designed by experimentally measuring the quality of the printed halftones at each combination of dot size and dot density, and then choosing the best combination of dot size and density for each desired output gray level. Because the dot density control and dot size control are designed by directly measuring the print quality, the resulting design accounts for attributes of both the printer and the halftoning system used.

Figure 10:
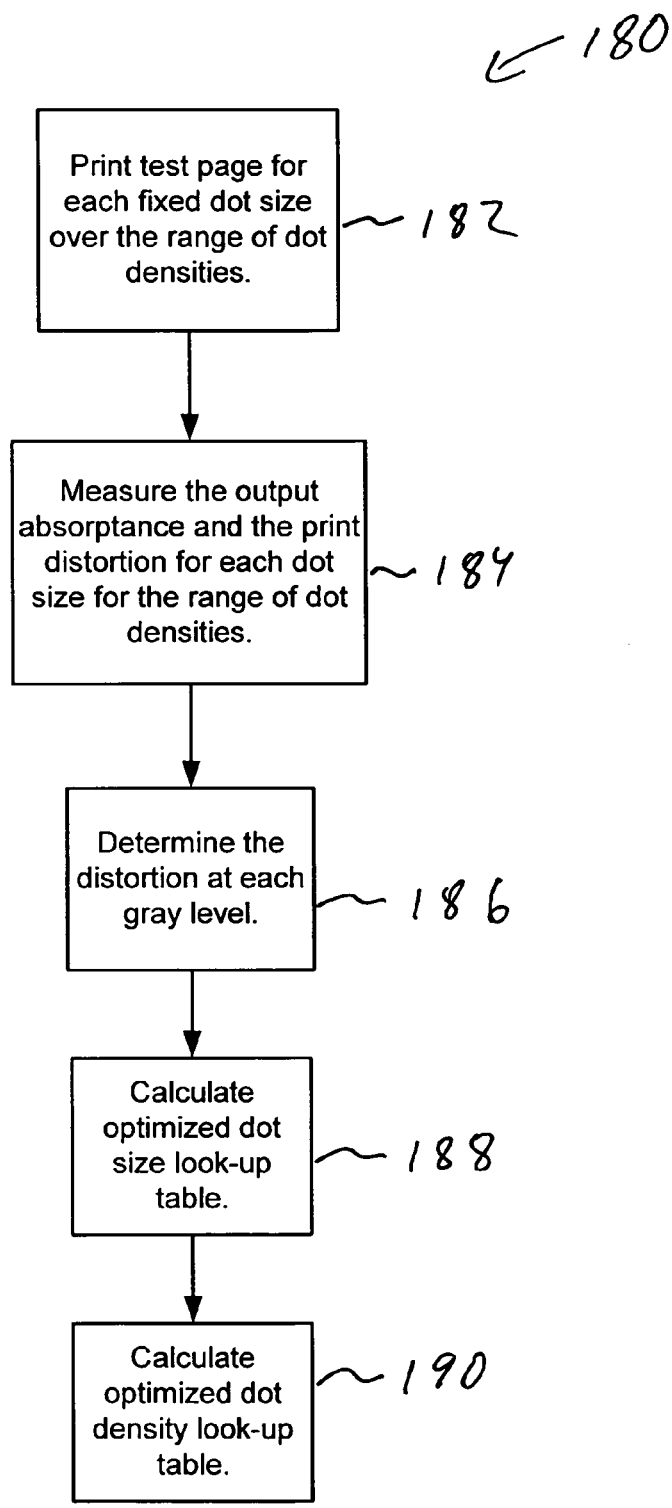
FIG. 10 is a flow chart showing a method of optimizing the dot size and dot density look-up tables using a closed loop measurement process in accordance with an embodiment of the present invention.

FIG. 10 is a flow chart 180 showing a method of optimizing the dot size and dot density look-up tables using a closed loop measurement process in accordance with an embodiment of the present invention. As shown in FIG. 10, a test page is printed for each fixed dot size over the range of dot densities (block 182). Let n be the dot density, $\theta$ be the dot size, and g be the dot gray level. The dot gray level g is measured in units of gamma corrected absorbtance ranging from 0 to 1. So the normalized luminance is given by $l=(1-g)^\gamma$ where $\gamma=2.2$. For each dot density and dot size, the output absorptance, i.e., gray level $g_\theta(n)$, and the print distortion, $D_\theta(n)$ are measured from the printed test pages that are scanned at 600 dpi (block 184). Each test page consists of an array of 16×16 blocks printed with a fixed dot size and dot densities ranging from 0 to 255 where 255 corresponds to all dots on. The blocks are of size 0.35 in.×0.35 in and placed in random order to avoid systematic measurement errors when printing across a page.

To measure the dot distortion $D_\theta(n)$ for each dot size $\theta$ and dot density n, a frequency weighted total squared error is used as the metric, where the frequency weighting is chosen to approximate the human visual system (HVS) response. The HVS model is a linear shift-invariant low pass filter. The frequency response of this filter is given by $$H(u, v) = \frac{aL^b \exp(-\sqrt{u^2 + v^2})}{c \ln L + d} \quad \text{equ. 5}$$

where L is the average luminance in cd/m$^2$, a=131.6, b=0.3188, c=0.525 and d=3.91.

Let f(m, n) denote the measured gray level measured in units of gamma corrected absorptance so that $I(m,n)=(1-f(m, n))^\gamma$ where I(m,n) is the normalized absorptance and $\gamma=2.2$. Then let $$g = \frac{1}{N} \sum_{m,n} f(m, n) \quad \text{equ. 6}$$

be the average absorptance level. The windowed error is computed as:

$$e(m,n)=(f(m,n)-g)w(m,n) \quad \text{equ. 7}$$

where w(m, n) is a Hamming window. The discrete Fourier transform (DFT) of e(m,n) is calculated to form E(k, l), and the print distortion metric is then given by $$D = \sqrt{\frac{1}{MN} \sum_{m,n} |E(k, l)|^2 H(k, l)} \quad \text{equ. 8}$$

where H(k, l) is the appropriately sampled version of H(u, v).

Figure 11:
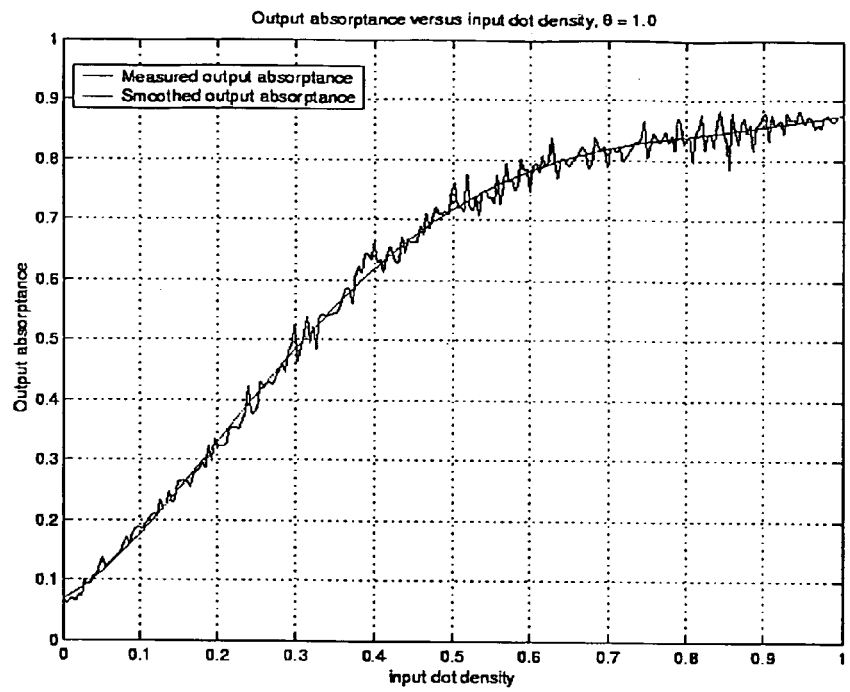
FIG. 11 is a graph showing the measured tone curve, $g_\theta(n)$, i.e., the output absorptance, versus input dot density for a fixed value of dot size $\theta=1$, where a square dot shape is used.
Figure 12:
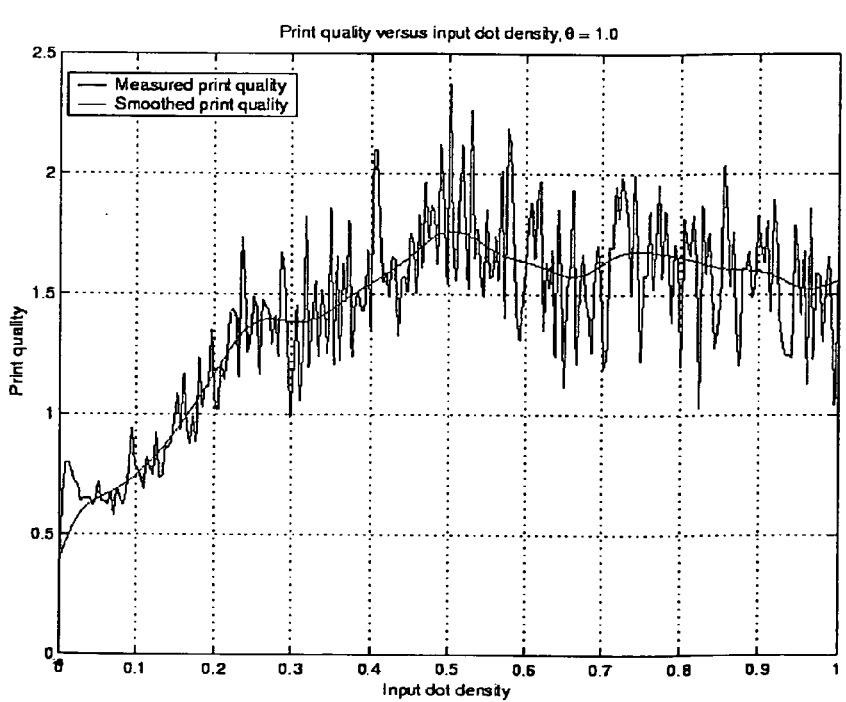
FIG. 12 is a graph showing the print distortion, $D_\theta(n)$ versus input dot density for a fixed value of dot size $\theta=1$, where a square dot shape is used.

FIGS. 11 and 12 are graphs 200 and 210 showing the measured tone curve, $g_\theta(n)$, i.e., the output absorptance, and the print distortion, $D_\theta(n)$, respectively, versus input dot density for a fixed value of dot size $\theta=1$, where a square dot shape is used as discussed in reference to FIG. 9. As shown in FIGS. 11 and 12, the measurements of the tone curve and the distortion are noisy, so they must be appropriately smoothed. Smoothing the tone curve also ensures that the smoothed tone curve is monotonically increasing. Smoothing is performed using a combination of median and linear filtering and polynomial curve fitting, which are well known in the art. For example, the raw data of the tone curve may be smoothed with a median filter of length 3 that is applied 5 times followed by a linear filter that is 3 times with a filter kernel [0.25, 0.5, 0.25]. A 5$^{th}$ order polynomial curve fitting is then applied to obtain a smooth tone curve. The printing distortion curve, for example, may be smoothed by squaring the measured data, applying a median filter of length 9, applying a linear filter 40 times with a filter kernel [0.25, 0.5, 0.25], and then taking the square root of the result. The tone-corrected ramp for each dot size is printed out to see if the resulting curve is reasonable. Of course, any desired method of smoothing may be used to generate a reasonably smooth curve.

Once the tone and distortion curves are determined for each dot size, e.g., θ=0.3 to 1.4, these curves are used to determine the distortion at each gray level (block 186). Each tone curve is inverted to compute the value of the dot density required to produce each gray level.

$$n_\theta(\tilde{g}) = \max_n \{g_\theta(n) \leq \tilde{g}\} \qquad \text{equ. 9}$$

Figure 13:
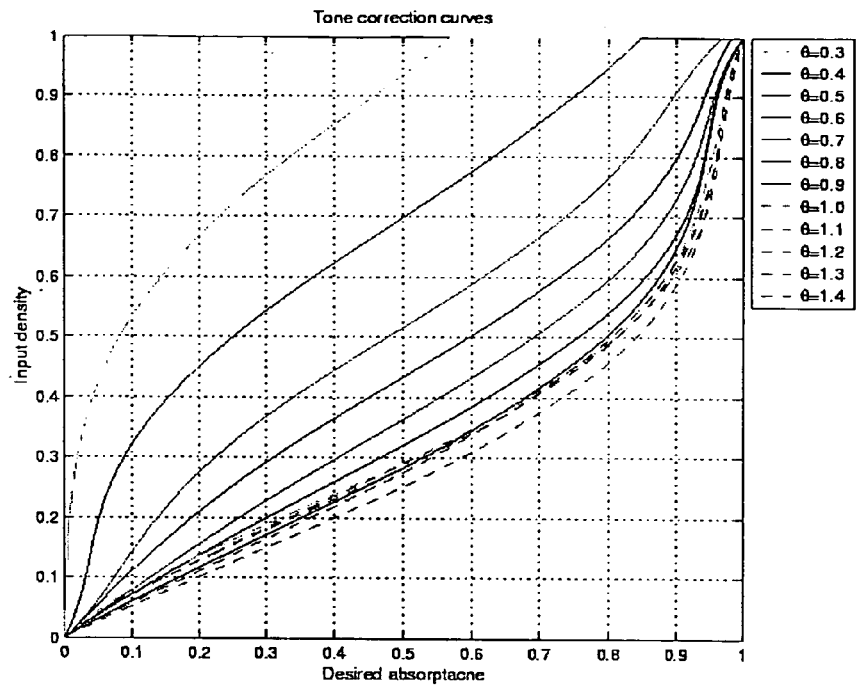
FIG. 13 is a graph showing a set of inverse tone curves for dot sizes ranging from 0.3 to 1.4.

FIG. 13 is a graph 220 showing a set of inverse tone curves for dot sizes ranging from 0.3 to 1.4. The x-axis is the desired output absorptance, while the y-axis is the dot density required to produce that absorptance level.

The inverse tone curves are used to determine the print distortion as a function of gray level.

$$D_{\theta,g} = D_\theta(n_\theta(g)) \qquad \text{equ. 10}$$

Figure 14:
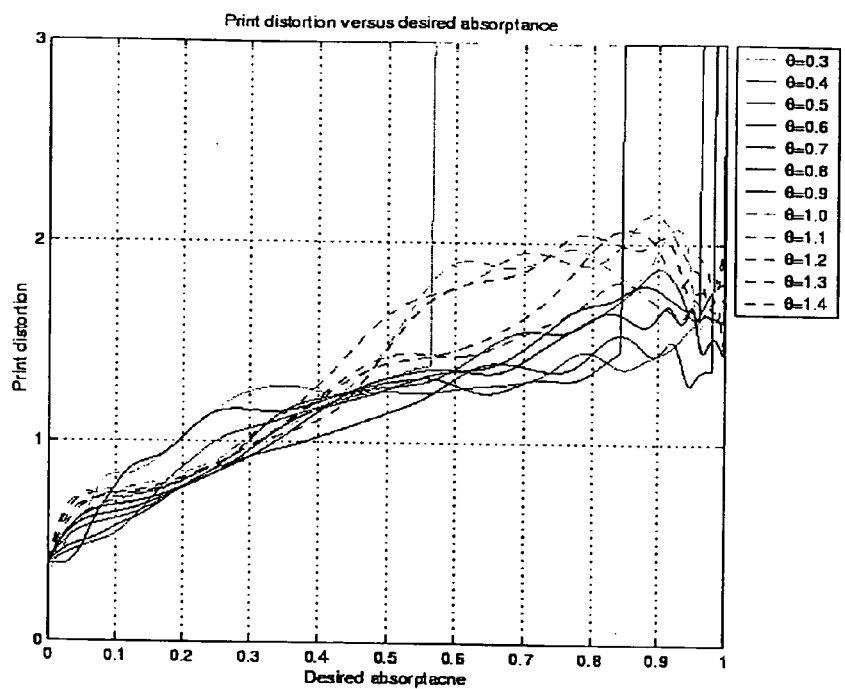
FIG. 14 is a graph showing a set of plots of the print distortion versus the desired output absorptance for dot sizes ranging from 0.3 to 1.4, where each curve corresponds to $D_{\theta,g}$ as a function of g for fixed $\theta$.

FIG. 14 is a graph 230 showing a set of plots of the print distortion versus the desired output absorptance for dot sizes ranging from 0.3 to 1.4, where each curve corresponds to $D_{\theta,g}$ as a function of g for fixed θ. These curves can be used to determine the best value of dot size for each desired output absorptance. For example, at the low values of absorptance, the smaller dot sizes generally produce lower distortion.

With these measurements, the optimized dot size LUT 124 and dot density LUT 122 can be calculated (blocks 188 and 190). These two look-up tables denoted by $\theta_i$ and $n_i$, respectively, where i ranges from 0 to 255. The look-up table functions, $g_i$ and $\theta_i$ may be optimized so that both are smooth and achieve nearly optimal print quality at each desired absorptance level, by minimizing a cost function shown below as a function of the look-up tables $\theta_i$.

$$\text{cost} = \sum_{i=0}^{255} D_{\theta_i,i}^2 + \frac{1}{2\sigma^2} \sum_{i=1}^{255} (\theta_i - \theta_{i-1})^2 \qquad \text{equ. 11}$$

Here σ is a parameter that controls smoothness of the result by forcing the values of the parameters $\theta_i$ to only change in small amounts. Because the print distortion function is only measured for discrete values of the dot size θ, the function must be interpolated using e.g., cubic spline interpolation, for missing values. Coordinate decent optimization is used to minimize the cost function; however, other optimization methods can be used and may be desirable, particularly ones that are robust to local minima in the cost functional.

Figure 15:
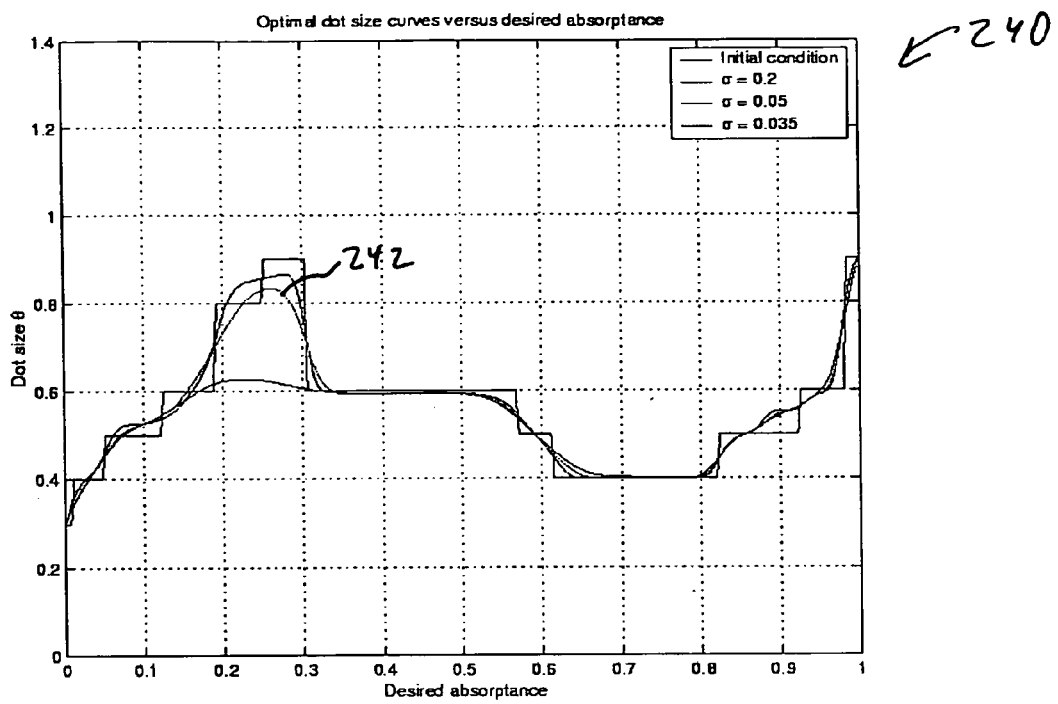
FIG. 15 is a graph showing a dot size curve for different a values, where the optimized dot size look-up table, $\theta_i$ used is $\sigma=0.05$.

FIG. 15 is a graph 240 showing a dot size curve for different σ values as a function of desired absorptance, where the optimized dot size LUT 124 curve 242, $\theta_i$ is σ=0.05. The smooth curve 242 is used as the dot size LUT 124 for the AM/FM halftoning system 120, shown in FIG. 5. Smaller values of a can be used to increase the smoothness of the dot size LUT, and larger values of a can be used to reduce the smoothness of the LUT.

Once the look-up table $\theta_i$ is determined, the corresponding dot density LUT 122 $n_i$ may be determined by using the inverse tone curves, $n_\theta(g)$ shown in graph 220 in FIG. 13, so that:

$$n_i = n_{\theta_i}(i) \qquad \text{equ. 12}$$

Again, because $n_\theta(i)$ is not measured for each value of dot size θ, the intermediate values may be interpolated using, e.g., cubic spline interpolation.

Figure 16:
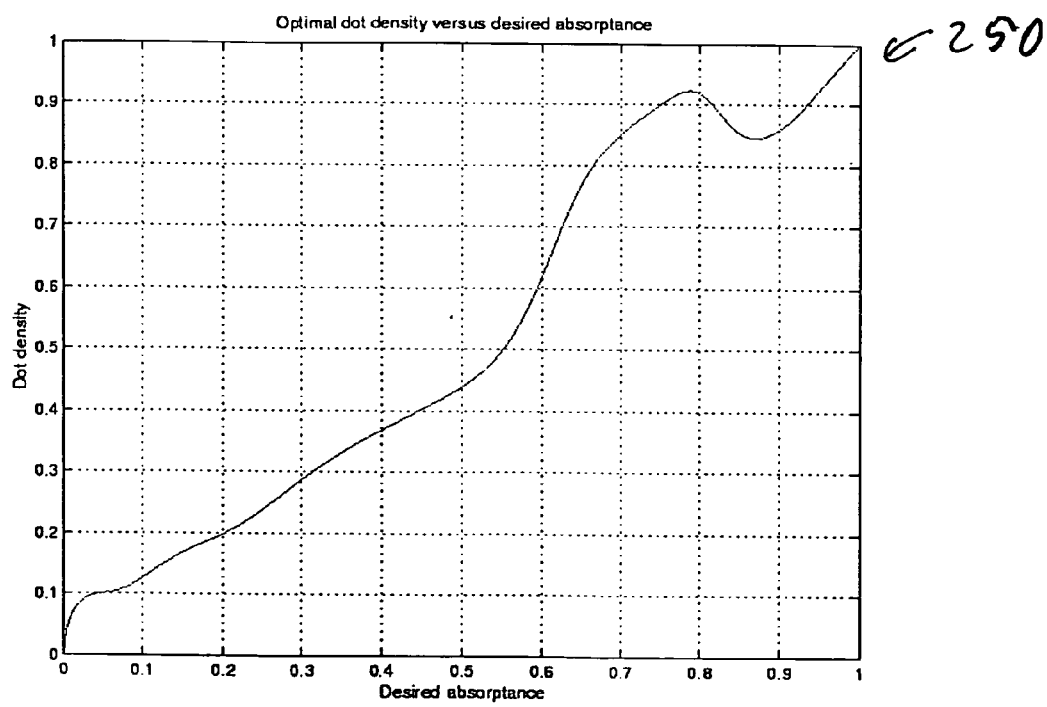
FIG. 16 is a graph showing a dot density curve for an optimized dot density look-up table that corresponds to the curve $\sigma=0.05$ shown in graph in FIG. 15 and is a function of the desired absorptance.

FIG. 16 is a graph 250 showing the dot density curve that corresponds to the curve 242 shown in graph 240 in FIG. 15 and is a function of the desired absorptance. The dot density curve shown in graph 250 is used as the dot density LUT 122 for the AM/FM halftoning system 120, shown in FIG. 5.

While graphs 240 and 250 may be used as the dot size LUT 124 and dot density LUT 122 in the AM/FM halftoning system 120, in practice, the best results may require some manual adjustment of these curves. For example, the dot density curve in graph 250 is not monotone. While the resulting gray levels of the AM/FM halftoning system 120 are still monotone due to the increasing dot size at those gray levels, in practice, it may be more desirable to constrain the solution to have monotone increasing dot density.

Figure 17:
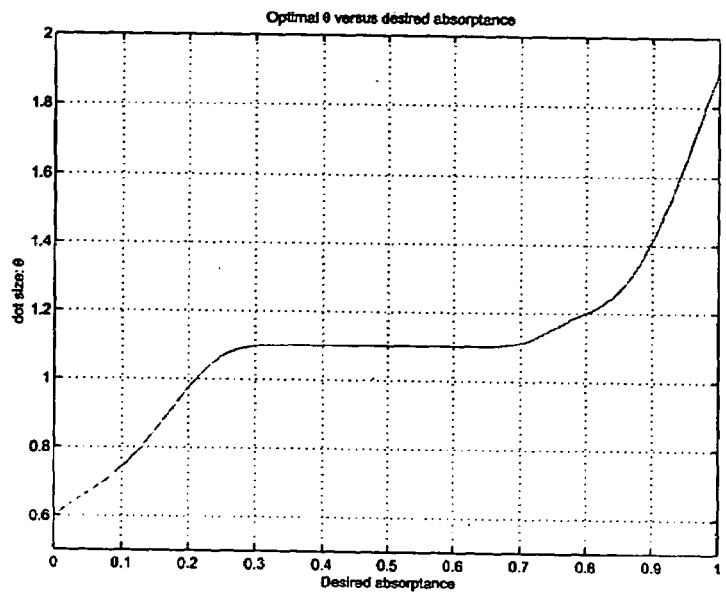
FIG. 17 is a graph showing another dot size curve for an optimized dot size look-up table as a function of desired absorptance.
Figure 18:
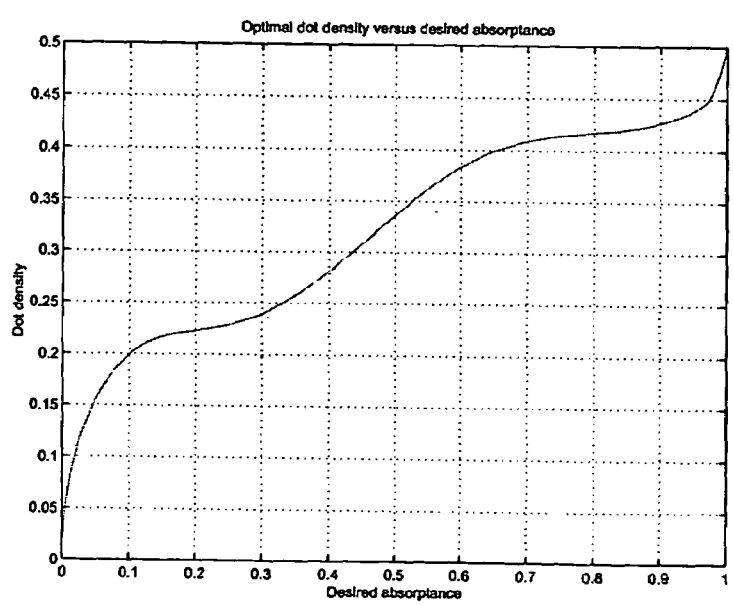
FIG. 18 is a graph showing a dot density curve for an optimized dot density look-up table that corresponds to the curve shown in graph in FIG. 17 and is a function of the desired absorptance.

FIGS. 17 and 18 are graphs 260 and 270, which show a dot size curve and dot density curve, respectively, as used with an eight-bit PWM code embodiment in which the pixel pairs are used, as described in reference to FIGS. 7A and 7B.

Figure 19:
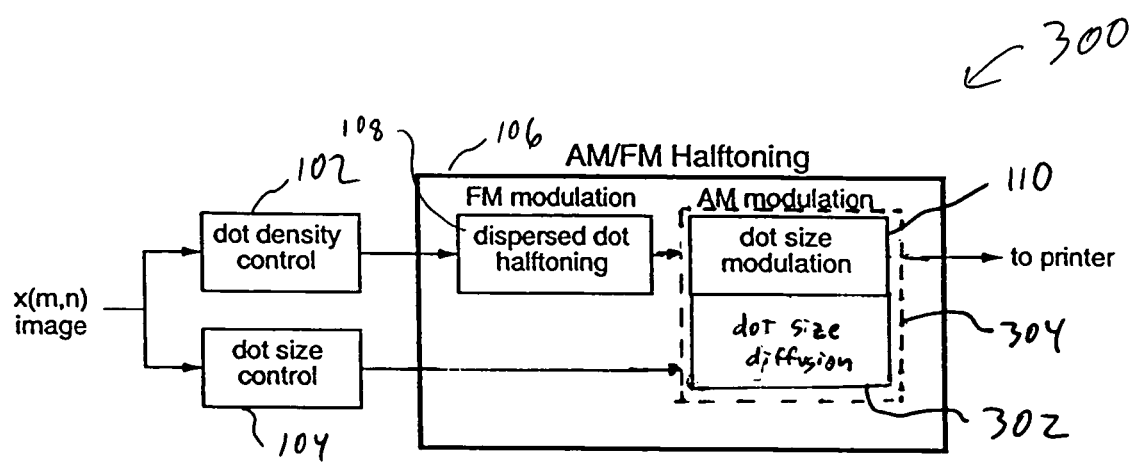
FIG. 19 shows another embodiment of the AM/FM halftoning system, in accordance with the present invention.

It should be understood that variations of the present AM/FM halftoning system are possible. For example, FIG. 19 shows an embodiment of the AM/FM halftoning system 300, which is similar to the embodiments shown in FIG. 3, like designated elements being the same. AM/FM halftoning system 300, however, includes a dot size diffusion unit 302, which performs error diffusion for dot size in a manner similar to the dot density diffusion system described above, e.g., in reference to FIG. 6. The dot size diffusion unit 302 operates with dot size modulation unit 110 within the AM modulation unit 304. This embodiment may be particularly useful when the PWM levels are limited. Thus, for example, if the PWM code is a two-bit code, four PWM levels are possible. With only four PWM levels, contouring artifacts or discontinuities will arise. With the use of dot size diffusion unit 302, the contouring artifacts may be minimized.

The source code in Appendices B1 and B2 written in C programming language are an example of an implementation of the present invention using a two-bit PWM code to control a printer system having a pulse width modulated laser capability for each printed pixel. Appendix B3 lists the particular coefficients used in the Tone-Dependent Error Diffusion process for the two-bit code used in conjunction with Appendices B1 and B2.

Figure 20:
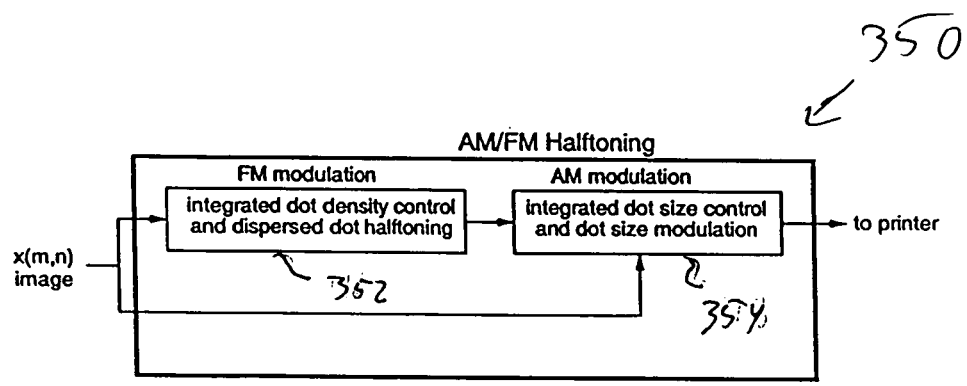
FIG. 20 shows a block diagram illustrating another embodiment of the AM/FM halftoning system.

FIG. 20 shows a block diagram illustrating another possible embodiment of the present AM/FM halftoning system. FIG. 20 shows an integrated AM/FM halftoning system 350 in which the dot density control is integrated into the dispersed dot halftoning system 352 and the dot size control is integrated into the dot size modulation system 354. It should be understood, of course, that other variation exist, such as integrating only the dot density control into the dispersed dot halftoning system 352 or only the dot size control into the dot size modulation system 354. The integrated AM/FM halftoning system 350 has potential advantages of reducing quantization artifacts, reducing complexity, and improving halftone quality.

In one embodiment, the look-up tables and method for controlling the error diffusion process are provided on a computer readable medium, such as a microdiskette or floppy diskette as a printer driver. This printer driver is then installed into the computer so that the program is installed in the computer's RAM. Such a program may be also installed in the printer and, in one embodiment, installed in firmware within the printer. All logic functions may be implemented in hardware or software. Thus, for example, the image forming system may include a computer that is coupled to the printing device, where a computer program executed by the computer includes instructions for implementing the functions of the present invention. The computer may be, e.g., a host computer, microprocessor or any other appropriate device. If hardware is used, the various table values would be available to the circuitry implementing the halftone method via bus lines. The method may also be carried out by an ASIC, which controls the timing and transfer of data to the various logic devices and look-up tables as well as to and from the image map, as would be understood by those skilled in the art after reading this disclosure.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of halftoning an image, said method comprising:
   inputting an input pixel value for a pixel location within said image;
   modulating the dot density of said image; and
   modulating the dot size of printed dots to obtain a printed halftone image;
   wherein modulating the dot density of said image comprises controlling the dot density for said pixel location within said image using said input pixel value and performing dispersed dot halftoning to produce a dot position based on said dot density;
   wherein said modulating the dot size of said image comprises controlling the dot size for said pixel location within an image using said input pixel value and performing dot size modulation based on said dot size and said dot position.

2. The method of claim 1, wherein said modulating the dot density modulates the spacing of the dot to be printed for said pixel location with respect to preceding and subsequent pixel locations and said modulating the dot size modulates the size of said dot to be printed for said pixel location.

3. The method of claim 1, wherein controlling the dot density for said pixel location comprises generating a dot density value based on said input pixel value, said dot density value being used to perform said dispersed dot halftoning, and wherein said controlling the dot size for said pixel location comprises generating a dot size value based on said input pixel value, said dot size value being used to perform dot size modulation.

4. The method of claim 3, wherein said generating a dot density value is performed using a first look up table and generating a dot size value is performed using a second look up table.

5. The method of claim 1, wherein controlling the dot density for said pixel location and performing dispersed dot halftoning are performed in a first integrated process and controlling the dot size for said pixel location and performing dot size modulation are also performed in a second integrated process.

6. The method of claim 1, wherein said modulating the dot size of said image further comprises diffusing at least a portion of the dot size for the pixel location to at least one subsequently processed pixel location.

7. The method of claim 1, wherein said modulating the dot density is performed using at least one of error diffusion, dispersed dot screening, and iterative search based halftoning.

8. The method of claim 7, wherein said modulating the dot density is performed using tone dependent error diffusion.

9. The method of claim 8, further comprising:
   generating a dot density value based on said input pixel value, said dot density value being used in said tone dependent error diffusion;
   said tone dependent error diffusion, comprising:
      combining said dot density value with at least one previous error value to produce a modified pixel value;
      comparing said modified pixel value with a threshold value to produce a halftone value for said pixel location; and
      using said halftone value for said pixel location to produce an error value that is diffused to at least one subsequently processed pixel.

10. The method of claim 1, wherein said modulating the dot size is performed using pulse width modulation.

11. The method of claim 10, wherein said pulse width modulation provides a first value indicating the width of the pulse and a second value indicating the justification of said pulse within a pixel location.

12. The method of claim 11, wherein when a printed dot is larger than one pixel, the pulse within adjacent pixels are justified together so that the dot may be formed with one continuous pulse.

13. The method of claim 1, wherein performing dispersed dot halftoning comprises using accumulated errors diffused from at least one other pixel location and providing an error for said pixel location to be diffused to at least one subsequently processed pixel location.

14. The method of claim 10, wherein said pulse width modulation is performed using a look-up table.

15. The method of claim 1, further comprising diffusing at least a portion of said dot size value for the pixel location to at least one subsequently processed pixel location.

16. A method of optimizing a dot size look-up table and a dot density look-up table for a printing system that uses dot size modulation and dot density modulation, the method comprising:
   printing at least one test page showing the combinations of dot sizes and dot densities;
   measuring the output absorptance for each combination and the print distortion for each combination;
   determining the print distortion at each output absorptance using the measured output absorptance and the measured print distortion for each combination;
   calculating the optimized dot size look-up table using the print distortion at each output absorptance; and
   calculating the optimized dot density look-up table using the print distortion at each output absorptance.

17. The method of claim 16, wherein determining the print distortion comprises:
   inverting the output absorptance for each combination to compute the value of the dot density required to produce each output absorptance; and
   using the inverted output absorptance and the print distortion for each combination to determine the print distortion as a function of output absorptance.

18. The method of claim 16, wherein calculating the optimized dot size look-up table comprises minimizing a cost function of the print distortion at each output absorptance as a function of dot size.

19. The method of claim 18, wherein calculating the optimized dot density look-up table further comprises using the calculated optimized dot size look-up table.

20. An image forming system for halftoning an image, said system comprising:
an image forming device operative to:
   receive an input pixel value for a pixel location within the image;
   modulate the dot density of the image by controlling the dot density for the pixel location within the image using the input pixel value and performing dispersed dot halftoning to produce a dot position based on the dot density; and
   modulate the dot size of printed dots to obtain a printed halftone image by controlling the dot size for the pixel location within an image using the input pixel value and performing dot size modulation based on the dot size and the dot position.

21. The image forming system of claim 20, wherein the image forming device is one of an electrophotographic printing device, electrophotographic copying device, and an inkjet printer.

22. The image forming system of claim 21, wherein the image forming device is operative to modulate the dot size using pulse width modulation.

23. The image forming system of claim 22, wherein the image forming device comprises a look-up table, and the pulse width modulation is performed using the look-up table.

* * * * *